(12) United States Patent
Hendriks et al.

(10) Patent No.: US 7,009,744 B1
(45) Date of Patent: Mar. 7, 2006

(54) SCANNING DEVICE INCLUDING AN OBJECTIVE SYSTEM FORMED OF A SINGLE MATERIAL

(75) Inventors: Bernardus Hendrikus Wilhelmus Hendriks, Eindhoven (NL); Pascal Jean Henri Bloemen, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/523,388

(22) PCT Filed: Jul. 16, 2003

(86) PCT No.: PCT/IB03/03252

§ 371 (c)(1),
(2), (4) Date: Feb. 1, 2005

(87) PCT Pub. No.: WO2004/019323

PCT Pub. Date: Mar. 4, 2004

(30) Foreign Application Priority Data

Aug. 5, 2002 (EP) .................................. 02078217

(51) Int. Cl.
*G02B 26/08* (2006.01)

(52) U.S. Cl. .................................. 359/205; 369/112.23
(58) Field of Classification Search ................ 359/205; 369/112.23
See application file for complete search history.

(56) References Cited

U.S. PATENT DOCUMENTS 6,147,956 A * 11/2000 Jutte et al. ............. 369/112.23
6,678,096 B1 * 1/2004 Sugi et al. .................. 359/719

* cited by examiner

*Primary Examiner*—James Phan
(74) *Attorney, Agent, or Firm*—Edward W. Goodman

(57) ABSTRACT

An optical scanning device (1) for scanning an information layer (4) of an optical record carrier (2), the device (1) comprising a radiation source (11) for generating a radiation beam (12, 15, 20) and an objective system (18) for converging the radiation beam on the information layer, the information layer being covered by a transparent layer (3) of thickness td and refractive index $n_d$. The objective system comprises a lens formed of a single material. The lens satisfies the condition: Fomula (I), where t is the thickness of the lens, FWD is the free working distance between the lens (18) and the carrier (2), where t, td and FWD are expressed in millimeters, and where $FWD + t_d/n_d < 0.51$.

15 Claims, 4 Drawing Sheets

SCANNING DEVICE INCLUDING AN OBJECTIVE SYSTEM FORMED OF A SINGLE MATERIAL

FIELD OF THE INVENTION

The present invention relates to an optical scanning device for scanning an optical record carrier, to a lens system suitable for, but not limited to, use as an objective lens in such a scanning device, and to methods for manufacturing such a device and such a system.

BACKGROUND OF THE INVENTION

In optical recording, increasingly the trend is towards miniaturisation of both the optical record carriers and the devices used to scan (e.g. write to and/or read from) the carriers. Examples of optical record carriers include CDs (compact discs) and DVDs (digital versatile discs).

In order for the optical record carriers to be made smaller, without a decrease in information storage capacity, the information density on the carrier must be increased. Such an increase in information density must be accompanied by a smaller radiation spot for scanning the information. Such a smaller spot can be realised by increasing the numerical aperture (NA) of the objective system used for focusing a radiation beam in the scanning device on the record carrier. Consequently, it is desirable to have a lens with a high numerical aperture (e.g. NA=0.85).

Conventional high NA objectives consist of two elements in order to ease the manufacturing tolerances, at the expense of introducing an extra assembly step to align the elements making up the objective lens.

The Japanese article "Single Objective Lens Having Numerical Aperture 0.85 for a High Density Optical Disk System" by M Itonga, F Ito, K Matsuzaki, S Chaen, K Oishi, T Ueno and A Nishizawa, Jpn. J. Appl. Phys. Vol. 41 (2002) pp. 1798–1803 Part 1, No. 3B March 2002, describes a single objective lens, having two aspherical surfaces, with a relatively high NA of 0.85. The lens is made of glass. The lens diameter is 4.5 mm, and the lens has an aperture diameter of 3.886 mm. This single element lens does not require the alignment assembly step needed by the two-element objective. Because of the high value of NA, the objective lens becomes more susceptible to variations in the manufacturing process i.e. manufacturing tolerances. Therefore, for these high NA objectives the manufacturing tolerances play an even more important role in the designing process than was the case for objectives having a lower numerical aperture.

In order for scanning devices to decrease in size, it is desirable that the components within the scanning devices (such as the objective lens) are made as small as possible.

However, it is not possible to simply scale down large lens designs to produce smaller lenses, as the lens design is dependent upon the properties of the optical recording medium. For instance, the lens design is dependent upon the properties of the transparent layer that typically covers the information layer on an optical record carrier, and which the scanning radiation beam must traverse. In the scaling down process the thickness of the cover layer of the disc remains unaffected (the same record carrier is likely to be used for both the normal sized objective and the small sized objective). Hence, the design of a small sized objective suitable for scanning the optical record medium will be substantially different from the design of a normal sized objective.

It will also be appreciated that as lenses are made smaller, the high NA objective lenses remain susceptible to variations in the manufacturing process i.e. manufacturing tolerances.

FIG. 1A shows an example of an objective lens 18, having two aspherical surfaces 181, 182 and of thickness t (the lens thickness along the optical axis 19). Subsequent FIGS. 1B, 1C and 1D respectively illustrate how the lens shape will vary due to variations in thickness, decentre and tilt of the two aspherical surfaces (in each instance, the original position of the surface 181 is illustrated by a dotted line). In these Figures, it is assumed that only the surface 181 has been affected by the variations in the manufacturing process. However, it will be appreciated that in actual fact either or both of the surfaces can be affected, and that either surface could be affected by two or more of these deviations simultaneously.

FIG. 1B illustrates the thickness of the lens being greater than the desired thickness t, due to the spacing in between the aspherical surfaces being larger than desired. However, it will be appreciated that the two aspherical surfaces could in fact be spaced closer together than desired as well.

FIG. 1C illustrates decentre i.e. in this example, how surface 181 has been formed shifted in a direction perpendicular to the ideal position relative to the desired optical axis 19.

FIG. 1D illustrates how surface 181 is tilted i.e. rotated in relation to the desired rotationally symmetric position along the principal axis.

It is an aim of embodiments of the present invention to provide an objective lens formed from a single material capable of withstanding reasonable manufacturing tolerances.

In optical scanning devices, radiation beams may enter the objective lens obliquely, due to inaccurate alignment of the objective lens within the scanning device, variations in the position of the recording carrier relative to the scanning device, or due to radiation beams being utilised that do not travel along the optical axis. For instance, such off-axis beams are typically used to provide information on positioning of the scanning radiation spot on the record carrier.

Such oblique beam entrance results in wave-front aberrations. Typically an allowance in the root mean square of the optical path difference ($OPD_{rms}$) of approximately 0.07 λ (where λ is the wave length of the relevant radiation beam), in total is allowed for wave-front aberrations of the scanning beam for the total optical scanning device, such that the system is diffraction limited. It can be convenient to express the $OPD_{rms}$ in mλ (where 0.001λ=1 mλ). The field of the lens system is the area within which oblique beams generate an $OPD_{rms}$ of less than 15 mλ. The field of view of the lens system is twice the field.

It is an aim of the embodiments of the present invention provide a small sized high NA objective lens formed from a single material that is tolerant to oblique beam entrance to the lens and tolerant for manufacturing errors.

SUMMARY OF THE INVENTION

In a first aspect, the present invention provides an optical scanning device for scanning an information layer of an optical record carrier, the device comprising a radiation source for generating a radiation beam and an objective system for converging the radiation beam on the information layer, the information layer being covered by a transparent layer of thickness $t_d$ and refractive index $n_d$, the objective system being characterised in comprising a lens formed of a single material, the lens satisfying the condition:

$$0.8 < \frac{t}{1.18 - 2.28\left[FWD + \frac{t_d}{n_d}\right]} < 1.2$$

where t is the thickness of the lens, FWD is the free working distance between the lens and the carrier, where t, $t_d$ and FWD are expressed in millimeters, and where FWD+$t_d$/$n_d$<0.51.

By designing a lens to satisfy such constraints, the resulting lens is tolerant to oblique beam entrance and manufacturing errors.

In another aspect, the present invention provides a lens system comprising at least one lens for converging a radiation beam on an information layer of an optical record carrier, the information layer being covered by a transparent layer of thickness td and refractive index $n_d$, the lens system being characterised in comprising a lens formed of a single material, the lens satisfying the condition:

$$0.8 < \frac{t}{1.18 - 2.28\left[FWD + \frac{t_d}{n_d}\right]} < 1.2$$

where t is the thickness of the lens, FWD is the free working distance between the lens and the carrier, where t, $t_d$ and FWD are expressed in millimeters, and where FWD+$t_d$/$n_d$<0.51.

In a further aspect, the present invention provides a method for manufacturing a lens system comprising at least one lens for converging a radiation beam on an information layer of an optical record carrier, the information layer being covered by a transparent layer of thickness $t_d$ and refractive index $n_d$, the method comprising the step of: forming a lens of a single material, the lens satisfying the condition:

$$0.8 < \frac{t}{1.18 - 2.28\left[FWD + \frac{t_d}{n_d}\right]} < 1.2$$

where t is the thickness of the lens, FWD is the free working distance between the lens and the carrier, where t, $t_d$ and FWD are expressed in millimeters, and where FWD+$t_d$/$n_d$<0.51.

In another aspect, the present invention provides a method of manufacturing an optical scanning device for scanning an information layer of an optical record carrier, the information layer being covered by a transparent layer of thickness $t_d$ and refractive index $n_d$, the method comprising the steps of: providing a radiation source for generating a radiation beam; providing a lens system for converging the radiation beam on the information layer the lens system being characterised in comprising a lens formed of a single material, the lens satisfying the condition:

$$0.8 < \frac{t}{1.18 - 2.28\left[FWD + \frac{t_d}{n_d}\right]} < 1.2$$

where t is the thickness of the lens, FWD is the free working distance between the lens and the carrier, where t, td and FWD are expressed in millimeters, and where FWD+$t_d$/$n_d$<0.5 1.

Other aspects of the invention will be apparent from the dependent claims.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF THE EMBODIMENTS

Figure 1A:
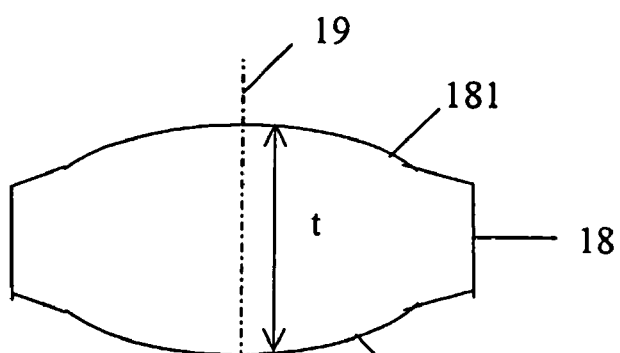
FIGS. 1A, 1B, 1C and 1D show a lens having two aspherical surfaces, with one of the surfaces being respectively: in the desired position, too far away from the second surface, decentred with respect to the second surface, and tilted with respect to the second surface.
Figure 1B:
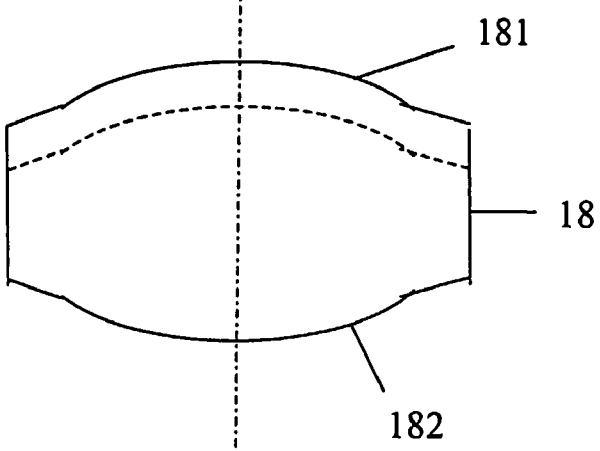
Figure 1C:
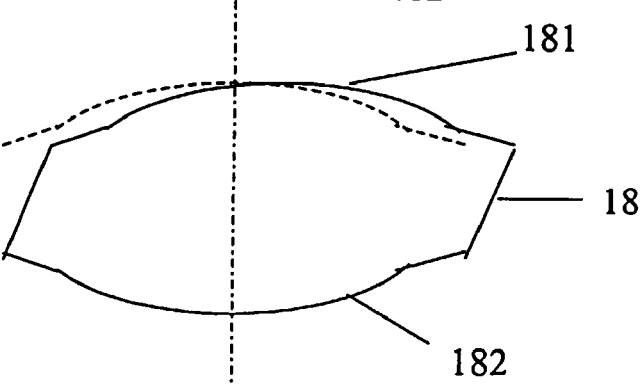
Figure 1D:
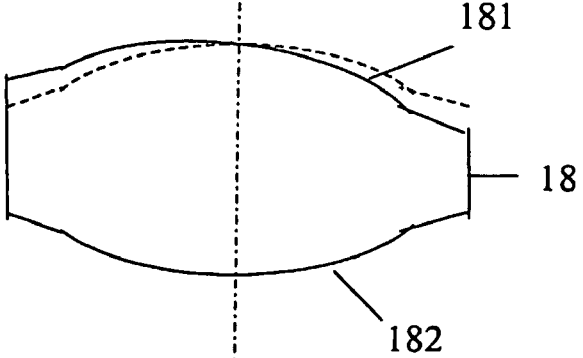
Figure 2:
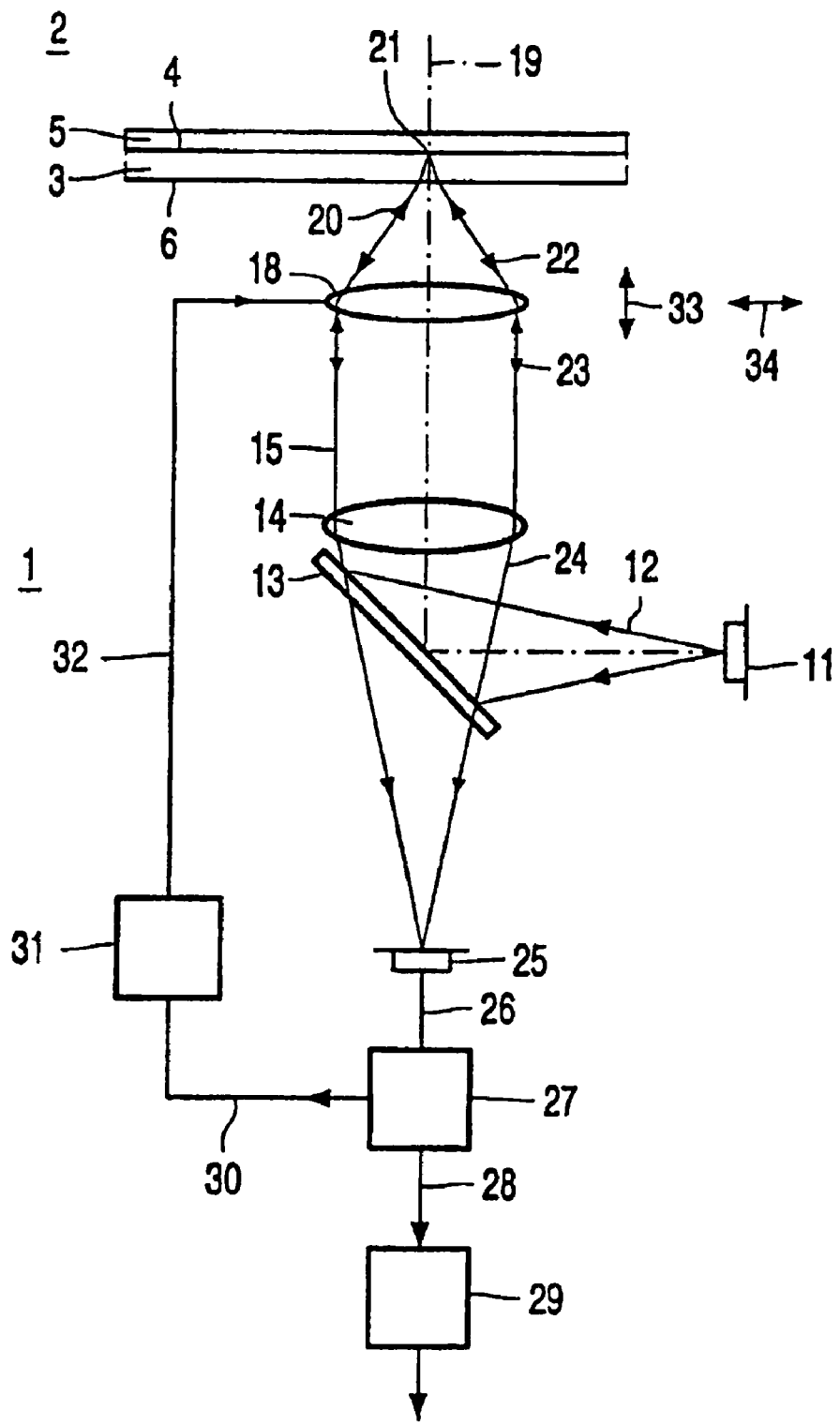
FIG. 2 shows a device for scanning an optical record carrier including an objective system.

FIG. 2 shows a device 1 for scanning an optical record carrier 2, including an objective lens 18 according to an embodiment of the present invention. The record carrier comprises a transparent layer 3, on one side of which an information layer 4 is arranged. The side of the information layer facing away from the transparent layer is protected from environmental influences by a protection layer 5. The side of the transparent layer facing the device is called the entrance face 6. The transparent layer 3 acts as a substrate for the record carrier by providing mechanical support for the information layer.

Alternatively, the transparent layer may have the sole function of protecting the information layer, while the mechanical support is provided by a layer on the other side of the information layer, for instance by the protection layer 5 or by a further information layer and a transparent layer connected to the information layer 4. Information may be stored in the information layer 4 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetisation different from their surroundings, or a combination of these forms.

The scanning device 1 comprises a radiation source 11 that can emit a radiation beam 12. The radiation source may be a semiconductor laser. A beam splitter 13 reflects the diverging radiation beam 12 towards a collimator lens 14, which converts the diverging beam 12 into a collimated beam 15. The collimated beam 15 is incident on an objective system 18.

The objective system may comprise one or more lenses and/or a grating. The objective system 18 has an optical axis 19. The objective system 18 changes the beam 17 to a converging beam 20, incident on the entrance face 6 of the record carrier 2. The objective system has a spherical aberration correction adapted for passage of the radiation beam through the thickness of the transparent layer 3. The converging beam 20 forms a spot 21 on the information layer 4. Radiation reflected by the information layer 4 forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25. The detection system captures the radiation and converts it into electrical output signals 26. A signal processor 27 converts these output signals to various other signals.

One of the signals is an information signal 28, the value of which represents information read from the information layer 4. The information signal is processed by an information processing unit for error correction 29. Other signals from the signal processor 27 are the focus error signal and radial error signal 30. The focus error signal represents the axial difference in height between the spot 21 and the information layer 4. The radial error signal represents the distance in the plane of the information layer 4 between the spot 21 and the centre of a track in the information layer to be followed by the spot.

The focus error signal and the radial error signal are fed into a servo circuit 31, which converts these signals to servo control signals 32 for controlling a focus actuator and a radial actuator respectively. The actuators are not shown in the Figure. The focus actuator controls the position of the objective system 18 in the focus direction 33, thereby controlling the actual position of the spot 21 such that it coincides substantially with the plane of the information layer 4. The radial actuator controls the position of the objective lens 18 in a radial direction 34, thereby controlling the radial position of the spot 21 such that it coincides substantially with the central line of track to be followed in the information layer 4. The tracks in the Figure run in a direction perpendicular to the plane of the Figure.

The device of FIG. 2 may be adapted to scan also a second type of record carrier having a thicker transparent layer than the record carrier 2. The device may use the radiation beam 12 or a radiation beam having a different wavelength for scanning the record carrier of the second type. The NA of this radiation beam may be adapted to the type of record carrier. The spherical aberration compensation of the objective system must be adapted accordingly.

In order to provide a small objective lens capable of being produced with reasonable manufacturing tolerances, we propose an objective lens formed of a single material, such as glass. Such a lens can be made using a glass moulding process. Preferably, the single material has a relatively high refractive index, and the lens is a single element lens formed with at least one aspherical surface.

In order to be able to provide a glass moulded objective lens with numerical aperture (NA)>0.65, and an entrance pupil diameter smaller than 2 mm which is tolerant for field, thickness differences, decenter and tilt of the two aspherical surfaces, we have found that it is desirable that the thickness t of the objective lens (the thickness of the lens along the optical axis) should comply with the relationship:

$$0.8 < \frac{t}{1.18 - 2.28\left[FWD + \frac{t_d}{n_d}\right]} < 1.2 \qquad (1)$$

where FWD is the free working distance, $t_d$ is the thickness of the transparent layer 3 covering the information layer on the record carrier, and $n_d$ the refractive index of this transparent layer. It is assumed that the relevant thickness and distance dimensions (t, FWD and $t_d$) are measured in millimeters.

The free working distance corresponds to the distance the lens can be moved before contacting the record carrier i.e. the distance from the surface of the lens facing the record carrier to the surface of the transparent layer 3, as measured along the optical axis.

More preferably, the thickness of the lens complies with the relationship:

$$0.9 < \frac{t}{1.18 - 2.28\left[FWD + \frac{t_d}{n_d}\right]} < 1.1 \qquad (2).$$

Preferably, $FWD + t_d/n_d < 0.51$.

We have also discovered that it is preferable that the refractive index n of the objective lens complies with the relationship:

$$-0.1 < \qquad (3)$$

$$n - 2.49 + 2.79\left(\frac{FWD + \frac{t_d}{n_d}}{F}\right) - 2.28\left(\frac{FWD + \frac{t_d}{n_d}}{F}\right)^2 < 0.1$$

where F is the focal length of the objective lens.

Even more preferably, the refractive index n of the objective complies with the relationship:

$$-0.05 < \qquad (4).$$

$$n - 2.49 + 2.79\left(\frac{FWD + \frac{t_d}{n_d}}{F}\right) - 2.28\left(\frac{FWD + \frac{t_d}{n_d}}{F}\right)^2 < 0.05$$

Furthermore, it is preferable that the normalised optical power P (the optical power of the lens surface divided by the total optical power of the lens system) of the second surface of the objective (i.e. the lens surface facing the record carrier) complies with $$-0.2<P<0.15 \qquad (5),$$

or even more preferably $$-0.15<P<0.1 \qquad (6).$$

In our experiments, the optimum optical power has been found to be P=−0.025.

It will be appreciated that the above relationships relating to P are particularly counterintuitive, as they show that the majority of the power of the lens should come from the first surface of the lens (i.e. the surface facing the radiation source when in use), with very little power of the lens, if any, being produced by the second surface. The optimum power of P=−0.025 indicates that such a lens design has an almost flat second surface.

In use in a scanning device, the lens might be used in combination with different wavelengths of radiation (different wavelengths may be used to read and write data). Alternatively the wavelength of the radiation source (e.g. a laser) may change as a function of the power of the radiation beam (different powers may be utilised to read and write data to an information recording medium). In order that the lens is tolerant to such variations in wavelength, it is preferable that the Abbe number of the lens material (e.g. glass) is greater that 40.

Figure 3:
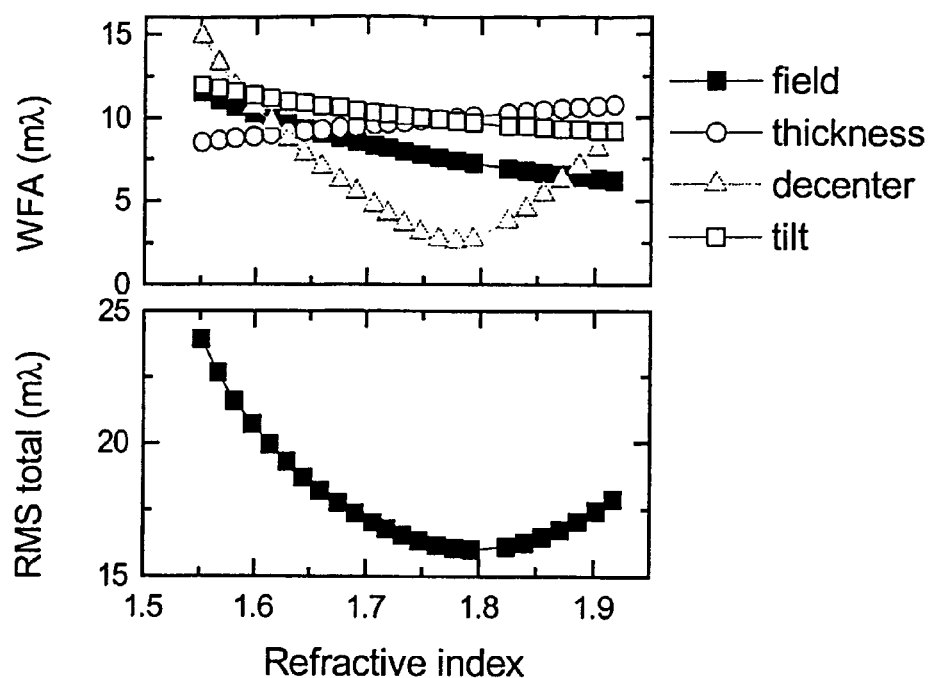
FIG. 3 illustrates, as an average of different objective lens designs, the wave-front abberation arising from respectively field, thickness, decentre and tilt as a function of refractive index, as well as the root mean square total wave-front abberation arising from these four factors.
Figure 4:
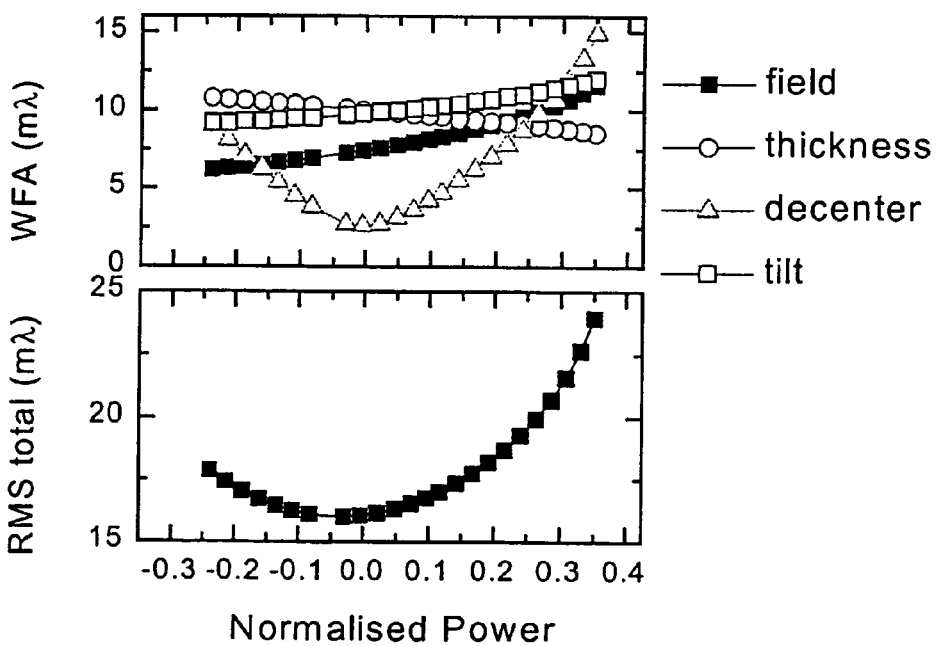
FIG. 4 illustrates, as an average of different objective lens designs, the wave-front abberation arising from respectively field, thickness, decentre and tilt as a function of normalised power of the surface of the objective lens facing the record carrier, as well as the root mean square total wave-front abberation arising from these four factors.
Figure 5:
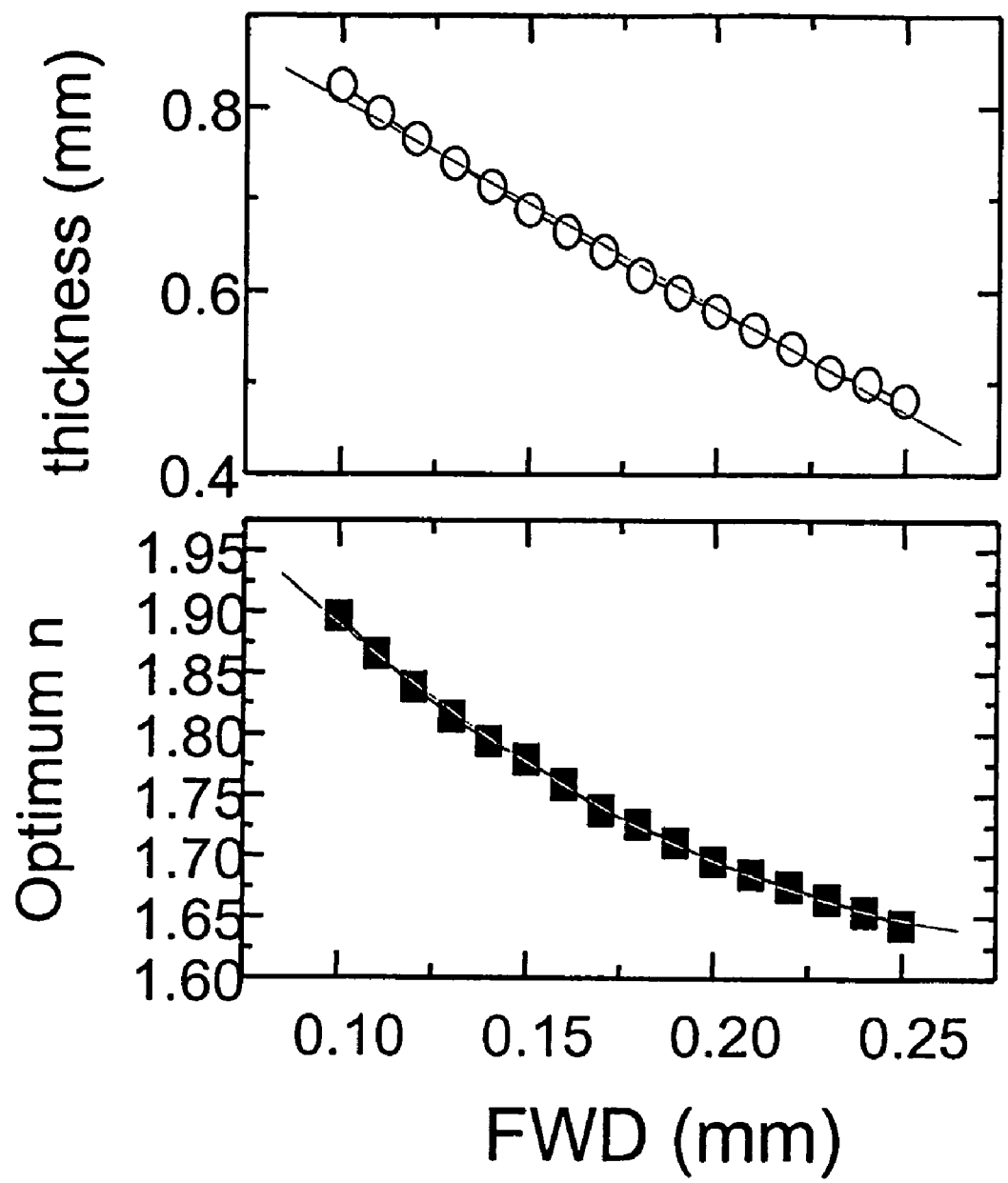
FIG. 5 illustrates the average optimum thickness of the objective lens and the optimum refractive index n for differing objective lens designs, as a function of the Free Working Distance (FWD).

Table 1 provides details of four explicit lens designs according to embodiments of the present invention. The average performance of various designs including the four tabulated in table 1 is shown in FIGS. 3, 4 and 5, which were used to derive the above preferred design relationships.

The front and back surfaces of the lenses each have a rotational symmetric aspherical shape which is given by the equation:

$$z(r) = \sum_{i=1}^{6} B_{2i} r^{2i}$$

with z the position of the surface in the direction of the optical axis in millimeters, r the distance to the optical axis in millimeters, and $B_k$ the coefficient of the k-th power of r. The values of $B_k$ for four different example lens designs are listed in Table 1, in which the $1^{st}$ asphere is assumed to be the surface of the lens facing the radiation source. To calculate the normalised optical power P of the second aspherical surface the following formula is used $$P=B_2(1-n)\phi/NA$$

where $B_2$ is the first aspherical coefficient of the second surface, n the refractive index of the objective, is the entrance pupil diameter of the objective and NA the numerical aperture.

Examples 1, 2, 3 and 4 fulfil the requirement of equations (1) and (2). Furthermore, examples 2 and 3 fulfil the requirement of equation (3) while example 3 fulfils also equation (4). Finally, the requirements of equations (5) and (6) are fulfilled by examples 2 and 3.

FIG. 3 shows the wave-front aberrations due to an oblique radiation beam entrance to the lens of 0.1° field, with the lens having a 1 μm thickness difference (the deviation of the actual lens from the desired thickness t), 10 μm decenter aspheres and 0.01° tilt aspheres for various designs of the objective lens including the designs tabulated in table 1, as a function of the refractive index of the objective. The individual root mean square of the wave-front aberration (WFA) arising due to each of the contributions from the field, thickness, decenter and tilt is indicated, as is the root means square (RMS) total wave-front aberration.

Similarly, FIG. 4 shows the root mean square wave-front aberration due to 0.1° field, 1 μm thickness difference, 10 μm decenter aspheres and 0.01° tilt aspheres for the same objective lens designs, as a function of normalised power of the second surface of the objective lens (the lens surface facing the recording medium).

In both FIGS. 3 and 4, the lenses have a numerical aperture=0.85, and an entrance pupil diameter of 1.0 mm. The radiation beam has a wavelength λ=405 nm, and a free working distance (FWD) of 0.15 mm was utilised, with a recording medium having a covering layer (transparent layer 3) thickness of 0.1 mm, of refractive index 1.6223.

FIG. 5 shows the optimum thickness of the objective lens and the optimum refractive index for an average of the various lens designs as a function of the free working distance (FWD). This data assumes that each of the lenses has an NA=0.85, and an entrance pupil diameter 1.0 mm. A radiation beam of wavelength λ=405 nm was utilised, in conjunction with a recording medium (e.g. a disk) having a covering layer thickness of 0.1 mm and a refractive index of 1.6223.

FIG. 3 shows that as the refractive index n increases, the field and tilt tolerance increase, whilst the thickness tolerance decreases. The decenter tolerance shows an optimum (i.e. minimum) near n≈1.78. Combining all four tolerances shown in the figure, it is shown that the optimum lens

TABLE 1

| Example | 1 | 2 | 3 | 4 |
|---|---|---|---|---|
| Numerical aperture | 0.85 | 0.85 | 0.85 | 0.85 |
| Entrance pupil diameter (mm) | 1.0 | 1.0 | 1.0 | 1.0 |
| Wavelength (nm) | 405 | 405 | 405 | 405 |
| Glass type objective | N-PSK58 | N-LAK14 | S-LAM60 | LASFN9 |
| Refractive Index n glass objective | 1.58254 | 1.71797 | 1.76845 | 1.89827 |
| Abbe number glass objective | 71.2 | 55.4 | 49.3 | 32.17 |
| Thickness t objective (mm) | 0.70697 | 0.69271 | 0.688424 | 0.67883 |
| Free working distance FWD (mm) | 0.15 | 0.15 | 0.15 | 0.15 |
| Cover layer thickness $t_d$ disc (mm) | 0.1 | 0.1 | 0.1 | 0.1 |
| Refractive index $n_d$ disc | 1.6223 | 1.6223 | 1.6223 | 1.6223 |
| 1st asphere | | | | |
| $B2$ (mm$^{-2}$) | 1.252653 | 1.118661 | 1.080716 | 1.003787 |
| $B4$ (mm$^{-4}$) | 1.036043 | 0.794731 | 0.732904 | 0.618266 |
| $B6$ (mm$^{-6}$) | 0.536839 | 0.649479 | 0.658108 | 0.570247 |
| $B8$ (mm$^{-8}$) | 6.545626 | 2.411804 | 1.328642 | 0.263065 |
| $B10$ (mm$^{-10}$) | −11.8727 | −5.65806 | −2.352052 | 0.598564 |
| $B12$ (mm$^{-12}$) | −23.9465 | −11.8816 | −13.295474 | −12.3978 |
| 2$^{nd}$ asphere | | | | |
| $B2$ (mm$^{-2}$) | −0.44926 | −0.11364 | −0.011583 | 0.196737 |
| $B4$ (mm$^{-4}$) | 3.706148 | 1.02182 | 0.249570 | −1.1027 |
| $B6$ (mm$^{-6}$) | −30.8787 | −10.9643 | −4.684428 | 5.315061 |
| $B8$ (mm$^{-8}$) | 159.8768 | 77.71455 | 45.715261 | −3.93994 |
| $B10$ (mm$^{-10}$) | −361.194 | −240.078 | −173.00998 | −69.0928 |
| $B12$ (mm$^{-12}$) | 0 | 0 | 0 | 0 |
| Normalised power 2$^{nd}$ asphere | 0.308 | 0.096 | 0.010 | −0.208 | designs are found when the relationship shown in equation 3 holds, or more preferably that relationship shown in equation 4.

FIG. 4 shows that, with increasing normalised power of the second surface, the disc field and tilt tolerance decreases (i.e. the WFA increases), while the thickness tolerance increases. The decenter tolerance shows an optimum near a normalised power (P) of −0.025. Combining all these tolerances, it is found that the optimum lens designs are found when equation 5 holds, or even more preferably equation 6.

FIG. 5 shows that the optimum thickness t and the optimum refractive index n of the objective both decrease for increasing free working distance (FWD). Providing fits to the points illustrated in FIG. 6, shows that the optimum refractive index ($n_{opt}$) is given by $$n_{opt} = 2.21794 - 3.9321 * FWD + 6.60614 * FWD^2$$

where FWD is expressed in millimeters and the optimum thickness t as a function of FWD is given by $$t = 1.03616 - 2.27542 * FWD$$

where t and FWD are expressed in millimeters.

From these specific results, taking into account scaling relationships, it has been possible to deduce the optimum lens design parameters shown in equations 1, 2, 3 and 4.

It will be appreciated that different embodiments of the invention can be applied in relation to a variety of lens systems. Preferably, embodiments are utilised in respect of lens systems that have a numerical aperture of greater than 0.7. Preferably, lens systems in accordance with embodiments have an entrance pupil diameter of less than 2 mm, and even more preferably, less than 1.5 mm. Preferably, embodiments are utilised in conjunction with radiation beams having a wavelength less than 600 nm, including beams having wave lengths of approximately 405 nm.

Whilst the above embodiments have been described in conjunction with lenses formed only of glass (and normally formed by a glass moulding process), it will be appreciated that the parameters of the present invention are appropriate for lens designs formed of any single material e.g. plastic lenses (for instance, formed by plastic moulding processes). Suitable plastics include COC (cyclo olefinic copolymer) and polycarbonate.

In view of the above examples, it will be appreciated that embodiments of the invention can be used to provide objective lenses formed from a single material capable of withstanding reasonable manufacturing tolerances. Further, embodiments of the present invention are tolerant to oblique beam entrance to the lens.

What is claimed is:

1. An optical scanning device for scanning an information layer of an optical record carrier, the device comprising a radiation source for generating a radiation beam and an objective system for converging the radiation beam on the information layer, the information layer being covered by a transparent layer of thickness $t_d$ and refractive index $n_d$, the objective system being characterised in comprising a lens formed of a single material, the lens satisfying the condition:

$$0.8 < \frac{t}{1.18 - 2.28\left[FWD + \frac{t_d}{n_d}\right]} < 1.2$$

where t is the thickness of the lens, FWD is the free working distance between the lens and the carrier, where t, $t_d$ and FWD are expressed in millimeters, and where $FWD + t_d/n_d < 0.51$.

2. A device as claimed in claim 1, wherein the lens satisfies the condition:

$$0.9 < \frac{t}{1.18 - 2.28\left[FWD + \frac{t_d}{n_d}\right]} < 1.1$$

3. A device as claimed in claim 1, wherein the refractive index n of the objective lens satisfies the condition:

$$-0.1 < n - 2.49 + 2.79\left(\frac{FWD + \frac{t_d}{n_d}}{F}\right) - 2.28\left(\frac{FWD + \frac{t_d}{n_d}}{F}\right)^2 < 0.1$$

where F is the focal length of the lens.

4. A device as claimed in claim 3, wherein the refractive index of the lens satisfies the condition:

$$-0.05 < n - 2.49 + 2.79\left(\frac{FWD + \frac{t_d}{n_d}}{F}\right) - 2.28\left(\frac{FWD + \frac{t_d}{n_d}}{F}\right)^2 < 0.05$$

5. A device as claimed in claim 1, wherein the normalised power P of the surface of the lens arranged to face the optical record carrier satisfies the condition:

$$-0.2 < P < 0.15.$$

6. A device as claimed in claim 5, wherein the normalised power P satisfies the condition:

$$-0.15 < P < 0.1.$$

7. A device as claimed in claim 1, wherein the device satisfies at least one of the conditions of:

$$-0.1 < n - 2.49 + 2.79\left(\frac{FWD + \frac{t_d}{n_d}}{F}\right) - 2.28\left(\frac{FWD + \frac{t_d}{n_d}}{F}\right)^2 < 0.1$$

and $$-0.2 < P < 0.15$$

where n is the refractive index of the lens, F is the focal length of the lens and P is the normalised power of the surface of the lens arranged to face the disc.

8. A device as claimed in claim 1, wherein the Abbe number of the material of the lens is greater than 40.

9. A device as claimed in claim 1, the device further comprising a detection system for converting radiation coming from the information layer to an information signal, and an information processing unit for error correction of the information signal.

10. A lens system comprising at least one lens for converging a radiation beam on an information layer of an optical record carrier, the information layer being covered by a transparent layer of thickness $t_d$ and refractive index $n_d$, the lens system being characterised in comprising a lens formed of a single material, the lens satisfying the condition:

$$0.8 < \frac{t}{1.18 - 2.28\left[FWD + \frac{t_d}{n_d}\right]} < 1.2$$

where t is the thickness of the lens, FWD is the free working distance between the lens and the carrier, where t, $t_d$ and FWD are expressed in millimeters, and where $FWD+t_d/n_d<0.51$.

11. A lens system as claimed in claim 10, wherein said single material is glass.

12. A lens system as claimed in claim 10, wherein said single material is plastic.

13. A method for manufacturing a lens system comprising at least one lens for converging a radiation beam on an information layer of an optical record carrier, the information layer being covered by a transparent layer of thickness $t_d$ and refractive index $n_d$, the method comprising the step of:

forming a lens of a single material, the lens satisfying the condition:

$$0.8 < \frac{t}{1.18 - 2.28\left[FWD + \frac{t_d}{n_d}\right]} < 1.2$$

where t is the thickness of the lens, FWD is the free working distance between the lens and the carrier, where t, $t_d$ and FWD are expressed in millimeters, and where $FWD+t_d/n_d<0.51$.

14. A method as claimed in claim 13, wherein a glass moulding process is utilised to form the lens.

15. A method of manufacturing an optical scanning device for scanning an information layer of an optical record carrier, the information layer being covered by a transparent layer of thickness $t_d$ and refractive index $n_d$, the method comprising the steps of:

providing a radiation source for generating a radiation beam;

providing a lens system for converging the radiation beam on the information layer, the lens system being characterised in comprising a lens formed of a single material, the lens satisfying the condition:

$$0.8 < \frac{t}{1.18 - 2.28\left[FWD + \frac{t_d}{n_d}\right]} < 1.2$$

where t is the thickness of the lens, FWD is the free working distance between the lens and the carrier, where t, $t_d$ and FWD are expressed in millimeters, and where $FWD+t_d/n_d<0.51$.

* * * * *